United States Patent [19]

Baxter et al.

[11] Patent Number: 5,309,820
[45] Date of Patent: May 10, 1994

[54] BEVERAGE PREPARING ASSEMBLIES

[76] Inventors: Royden L. Baxter, 5444 Marceau, Pierrefonds, Quebec, Canada, H8Z 2V1; David A. Pelling, 705 Devon Place, Baie D'Urfe, Quebec, Canada, H9X 2T3; Timothy S. Mackinnon, 72 Upper Edison, Saint-Lambert, Quebec, Canada, J4R 2R1

[21] Appl. No.: 88,717

[22] Filed: Jul. 9, 1993

Related U.S. Application Data

[63] Continuation of Ser. No. 872,000, Apr. 22, 1992, abandoned.

[30] Foreign Application Priority Data

Feb. 12, 1992 [CA] Canada .................. 2061106

[51] Int. Cl.$^5$ .............................................. A47J 31/24
[52] U.S. Cl. ...................... 99/280; 99/289 T; 99/295; 99/304
[58] Field of Search ............... 99/279, 280–283, 99/287, 289 R, 289 T, 292, 295, 297, 298, 300, 302 R, 304; 426/433

[56] References Cited

U.S. PATENT DOCUMENTS

| | | |
|---|---|---|
| 3,354,811 | 11/1967 | King .................. 99/289 T |
| 3,369,478 | 2/1968 | Black . |
| 3,537,384 | 11/1970 | Stauber . |
| 3,552,976 | 1/1971 | King . |
| 3,565,641 | 2/1971 | King . |
| 4,651,632 | 3/1987 | Motsch .................. 99/289 R |
| 4,873,915 | 10/1989 | Newman et al. . |
| 4,909,136 | 3/1990 | Newman et al. . |
| 4,920,870 | 5/1990 | Newman et al. . |
| 4,990,352 | 2/1991 | Newman et al. . |

FOREIGN PATENT DOCUMENTS

| | | |
|---|---|---|
| 90105835 | 3/1990 | European Pat. Off. . |
| 2052475 | 4/1972 | Fed. Rep. of Germany . |
| PCT/NL90/00103 | 7/1990 | PCT Int'l Appl. . |
| 2217976 | 8/1989 | United Kingdom . |

OTHER PUBLICATIONS

International search report, PCT/CA93/00050 filed on Feb. 9, 1993.

*Primary Examiner*—Robert W. Jenkins
*Attorney, Agent, or Firm*—Ronald S. Kosie; Robert Brouillette

[57] ABSTRACT

The present invention relates to assemblies and devices for the brewing of a beverage (e.g. coffee); the invention may, for example, be used in coin operated vending machines and the like. The invention in particular provides a brew chamber assembly for an apparatus for preparing a beverage from an aqueous medium and a particulate beverage material, the apparatus operating with a brewing cycle including the air agitation of a mixture of the aqueous medium and the particulate beverage material in a brew chamber. The brew chamber assembly comprises a brewing vessel having a floor,
    a compartment having a top wall, and
    a common partitioning wall, the common partitioning wall defining the top wall of said compartment and defining the floor of the brewing vessel, at least a portion of the common partitioning wall being configured as a filter for the evacuation of beverage from the vessel and being permeable to air, the compartment having opening means for the entry of air thereinto and for the exit of beverage therefrom, and the brew chamber assembly being characterized in that the compartment has a hopper configuration for gathering the beverage for discharge therefrom by the opening means. This brew chamber assembly may be used with a pump such as a peristaltic pump.

19 Claims, 8 Drawing Sheets

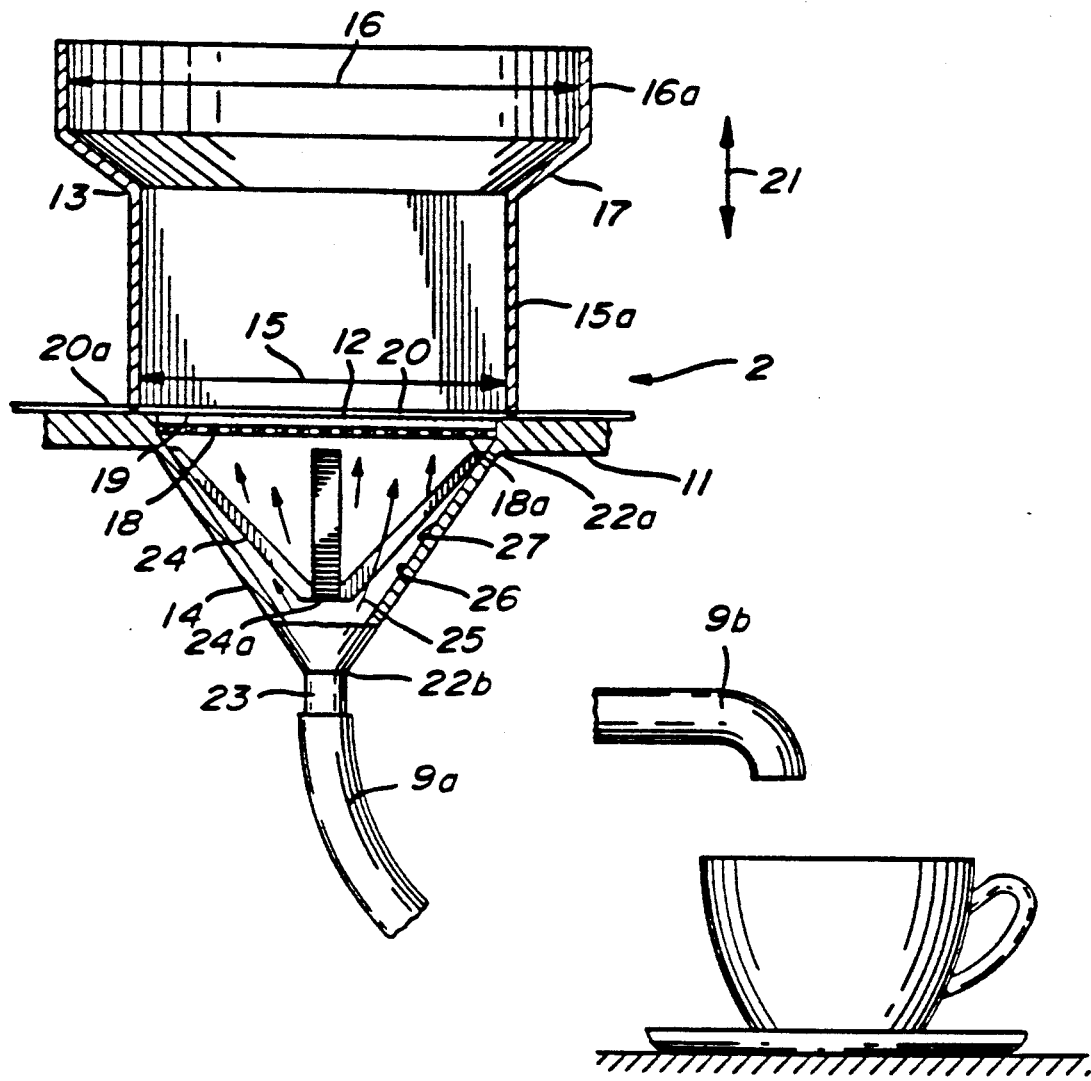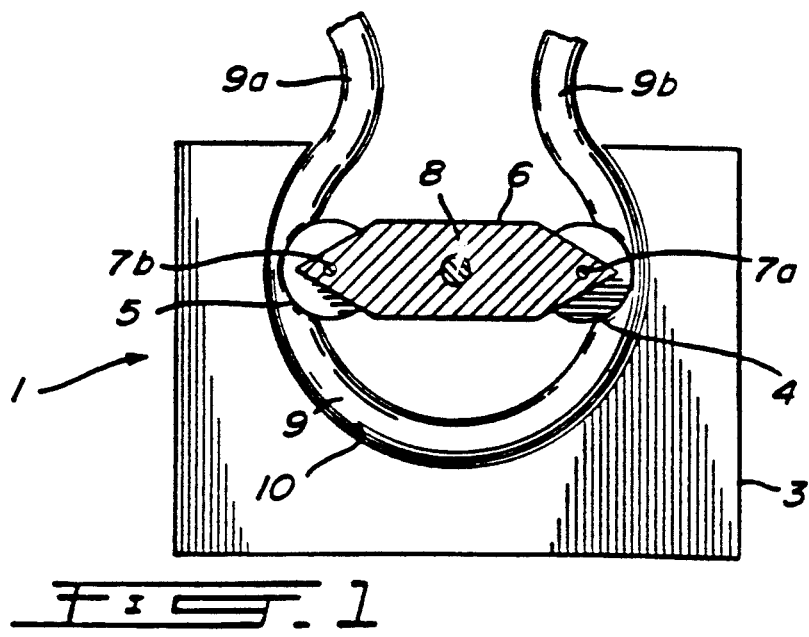

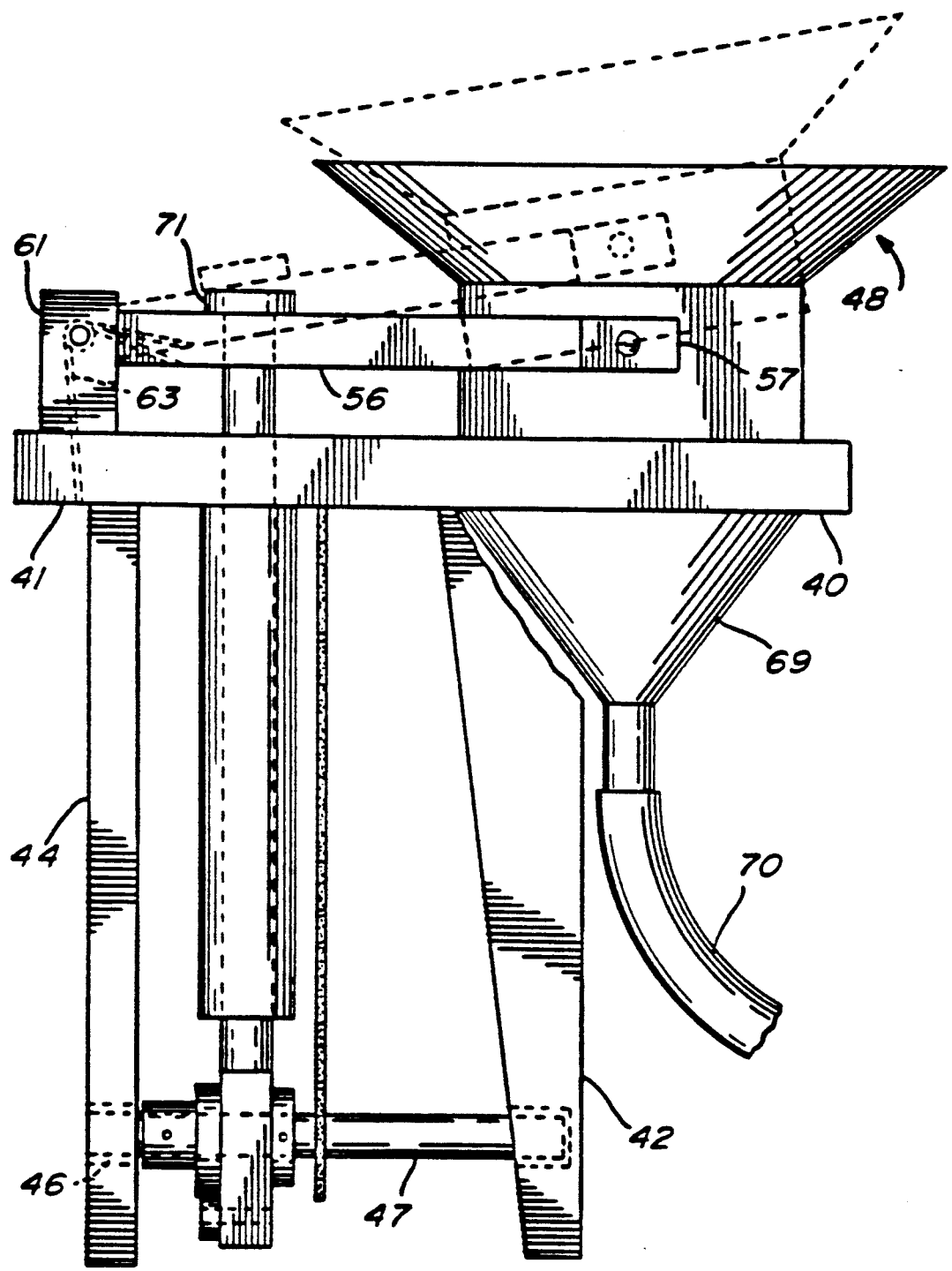

BEVERAGE PREPARING ASSEMBLIES

This is a continuation application of application Ser. No. 07/872,000 filed on Apr. 22, 1992, abandoned.

BACKGROUND

The present invention relates to assemblies and devices for the brewing of a beverage; the invention may, for example, be used in coin operated vending machines and the like. The invention particulary relates to beverages brewed from an aqueous medium and a particulate beverage material (for example, from, hot water and a coffee material, a tea material or the like).

For vending machines, it is desirable, from the point of view of the user, to be able to obtain a (acceptable) cup of beverage in as short a period of time as possible. From the point of view of the operator of the vending machine it is desirable to be able separate a maximum amount of beverage from the particulate beverage material; in this latter respect it is also desirable to have as dry a residue as possible in order to facilitate disposal of the residue.

The brew period for the extraction of an acceptable amount of solubles under ambient pressure conditions, may be reduced by increasing the amount of coffee grounds used per cup; this tactic however, increases the unit cost of the beverage product.

A number of coffee machines are known which employ a piston/cylinder combination for brewing coffee. At the end of each brew cycle, the coffee beverage, prior to discharge, is forced to pass through a filter, the ground coffee residue collected by the filter being thereafter separated from the piston/cylinder combination prior to the next brew cycyle.

Thus U.S. Pat. No. 3,565,641 teaches a piston/cylinder combination whereby a coffee beverage may be brewed in cup size amounts within a relatively brief period of time by forcing air through the mixture of hot water and beverage material and then filtering the obtained coffee beverage. Such air induced agitation improves considerably the brewing (leaching) process; it promotes and accelerates the thorough wetting of each of the particles of coffee by the hot water; and the agitation changes the water actually in contact with the coffee grounds so as to enhance the rate at which beverage (coffee) solubles dissolve. The brew-chamber of this reference is provided with a floor wall which is permeable to liquid and air but impermeable to the bulk of the insoluble coffee grounds; this floor wall also divides the brew-chamber from a piston-chamber. A piston is disposed in the piston-chamber for inducing a positive pressure (on the upward stroke) and a negative pressure (on the downward stroke). The piston/cylinder combination is configured such that during the upward stroke, the piston forces air trapped in the piston-chamber between the piston and the floor wall to pass through the floor wall into the the brew chamber so as to agitate the , liquid/solids mixture in the brew chamber. On the downward stroke away from the floor wall, beverage is pulled or sucked through the floor wall into the piston-chamber between the piston and the floor wall. An outlet is provided in the wall of the piston-chamber, spaced from the floor wall such that at the end of the downward stroke the coffee beverage can escape the piston-chamber by gravity into a waiting cup. Means are also provided for removing the waste coffee ground from the floor wall by replacing the used filter (with the grounds deposited thereon) with a fresh filter before each new brew cycle.

An alternate piston/cylinder combination is taught in U.S. Pat. No. 3,369,478; in this reference a permanent type filter is used. The piston/cylinder combination taught is such that the filter is mounted on the end of the piston, the upper surface of the filter being exposed after the brewing cycle for scraping away waste coffee grounds by scraper means. A small cavity is defined between the filter and the body of the piston and an opening through the piston body is included which communicates with the cavity. During the upward stroke of the piston, the brewing chamber is sealed off and contains in addition to the brewing mixture a cushion or layer of trapped air. The upward compression stroke of the piston effects discharge of the beverage and trapped air through the filter into the cavity for evacuation through the opening; the air is passed through the waste ground coffee for the purpose of effecting drying of this residue.

A number of drawbacks and limitations are associated with piston/cylinder combinations used for coffee brewers, namely:

A relatively large number of moving parts are associated with the pumping function. Accordingly, close attention must be paid to the repair and upkeep of the mechanism; more particularly, should the suction and compression characteristic of the system fall below that which is required, an expert repair person is needed in order to dismantle and rebuild the mechanism to replace or repair the piston/cylinder combination.

The maximum amount of coffee which may be produced by a piston/cylinder combination is limited by the volume displaceable during the piston stroke. In order to be able to deliver a larger maximum volume of coffee, the structure of the piston/cylinder combination must be altered so as to increase the upper limit of the pumping volume e.g. both the piston and cylinder may have to be replaced by correspondingly larger diameter or longer stroke units, the motor mechanism driving the piston including the piston arm may have to be replaced by a larger unit, etc. . . If significant replacements must be made, these can be burdensome to effect and can result in an undesirable increase in the size and weight of the apparatus. Morever, if the apparatus is intended to deliver a range of coffee volumes, increasing the size of the piston/cylinder combination may accentuate other drawbacks of such systems in relation to product taste, to the brewing temperature as well as the temperature of the final product.

The pumping mechanism has a relatively large number of parts such as the cylinder side walls, the piston head etc. which come into direct contact with the beverage; such contact can affect the final temperature of the product. The many parts of the mechanism can act as a heat sink with the undesirable side effect of robbing heat from the beverage during brewing, resulting in less efficient extraction of coffee solubles, i.e. extraction occurs better at higher water temperatures. This temperature effect will be greater, if the apparatus is intended to deliver a coffee volume which is smaller than the maximum pumping volume, i.e. the smaller volume of coffee to be produced will loose more relative heat than the larger volume.

As mentioned above, the maximum amount of coffee which may be produced by a piston/cylinder combination is limited by the volume displaceable during the piston stroke. However, for known devices, such as those following the teachings of U.S. Pat. No. 3,565,641, the brew vessel may provide a further limitation with respect to the maximum amount of coffee which may be produced. During the injection of air to agitate the brew mix, a significant amount of frothing or foaming may occur; the foam so produced, can, (if no special precautions are taken such as limiting the amount of brew mix and/or inserting foam suppression baffles in the brew vessel) overflow from the brew vessel and thus be lost as spillage.

for known devices such as those following the teachings of U.S. Pat. No. 3,565,641 a significant amount of fluid can remain in the piston-chamber (e.g. for an initial water input of 150 cc about 15 cc can remain in the piston chamber). A subsequent cup of coffee can thus be contaminated by this residual liquid, i.e. the residual liquid can lower the temperature of the beverage served and can distort its taste.

for known devices such as those following the teachings of U.S. Pat. No. 3,565,641 the coffee residue is relatively moist; for known devices such as those following the teachings of U.S. Pat. No. 3,369,478 the compressed air will tend to wedge particles into the openings of the permanent filter.

Accordingly, it would be advatageous to have an assembly for a brewing apparatus having a mechanically simple brew/pump mechanism with few moving parts and which can be relatively easily repaired or replaced.

It would be advatageous to have an assembly for a brewing apparatus having a mechanically simple brew/pump mechanism for providing a relatively small sized apparatus able to dispense relatively large single servings of a beverage such as coffee as well as relatively small servings (e.g. serving any amounts variable in size between about 4 to about 16 ounces).

It would be advantageous to have a mechanically simple brew/pump assembly for a brewing apparatus, the assembly having a reduced number of brew/pump elements, so as to limit or reduce beverage contact therewith as well as heat transfer during brewing and dispensing of the beverage.

It would be advantageous to have a mechanically simple brew/pump assembly for a brewing apparatus which provides for a positive and total displacement of beverage to a cup.

It would be advantageous to have a mechanically simple brew/pump assembly for a brewing apparatus which provides for back purge of air through the grounds residue after the beverage has been dispensed and which faclitates drying of the grounds residue and the loosening therof from the filter to facilitate removal from the filter or filter support means.

It would be advantageous to have a mechanically simple brew/pump assembly for a brewing apparatus, the assembly having a simple and relatively compact mechanism for suppressing splillage due to foaming during the injection of air into a brew vessel.

SUMMARY OF INVENTION

The present invention in accordance with one general aspect relates to an assembly for an apparatus for preparing or brewing a beverage from an aqueous medium and a particulate beverage material, the apparatus operating with a brewing cycle including the air agitation of a mixture of the aqueous medium and the particulate beverage material in a brew chamber, said assembly having a brewing vessel having a floor, at least a portion of said floor being configured as a filter for the evacuation of beverage from said vessel and being permeable to air, and fluid displacement means for forcing air into the brewing vessel through said floor and for withdrawing obtained beverage from the brewing vessel through said floor, characterized in that the fluid displacement means comprises one or more positive displacement, rotary pump means, each said pump means having a flexible pumping member, at least one said pump means being operatively connected to said floor and to an air source for forcing air through said floor, at least one said pump means being operatively connected to said floor and to a dispensing station for withdrawing obtained beverage from the vessel through said floor for delivery to said dispensing station.

In accordance with the present invention, the assembly may include means for controlling said pump means, the control means including means for selectively activating the pump means to force air into said brewing vessel through the floor and for selectively activating the pump means for reverse operation for withdrawing beverage from the brewing vessel through the floor for delivery to a dispensing station.

In accordance with the present invention one or more rotary pump means may be used. For example, two of the rotary pump means may be used; in this situation each of the pump elements of a respective pump means may be activated selectively such that only one pump element operates at a time, e.g. one of the pump elements forces air into the brewing vessel while the other is inoperative and when the air pump element is inactive the other beverage pump is activated for withdrawing beverage from the vessel.

Preferably, however, the fluid displacement means comprises a reversible rotary pump means having a single pump element (in addition to the usual motor element for the activation of the pump element), this pump means being operatively connected on one side thereof to the floor and on the other side thereof to an air source and to dispensing station.

The brewing vessel itself may take any form whatsoever, provided that it it is able to fulfill its function, e.g. to (sufficiently) contain the brewing ingredients during the brewing period while allowing air to enter the vessel for agitation and allowing beverage to leave the vessel. The brewing vessel may, for example, take on the aspect of the tubular member taught in U.S. Pat. No. 3,565,641 i.e. namely a displaceable open ended tubular member cooperating with a fluid permeable floor member to define the brewing vessel. Thus, for example, the brewing vessel nay comprise a fluid permeable floor member and an open ended tubular member displaceable between a first brewing position and a second non-brewing position; the tubular member may have a first open end and a second opposite open end; the first open end, when the tubular member is in said first position, abutting the floor member such that the floor member and the tubular member define the brewing vessel; and the first open end, when said tubular member is in said second position, being spaced apart from the common wall.

The tubular member may have an opening therethrough of rectangular cross-section, preferably square in cross-section with a square bottom edge. The tubular member may alternatively be cylindrical in configuration with a circular cross section. The tubular member may be a hybrid of the above forms; it may have a lower portion having a rectangular (e.g. square) bottom edge and an essentialy cylindrical upper portion, the upper and lower portions being connected together by a median transition portion.

In accordance with the present invention, the inner surface of the tubular member need not, however, be of constant cross-section. The second open end may also be larger or wider than the first open end of the tubular member, i.e. have a funnel-like configuration to prevent spillage. The tubular member may, for example, have a funnel (e.g. conical cross-sectional configuration) shaped inner surface the apex or vertex thereof being connected to the floor member directly or through a transition portion having, for example, a rectangular, cylindrical or hybrid rectangle-cylinder form as described above.

A large mouthed tubular member is preferred since, as mentioned above, during the injection of air to agitate the brew mix, a significant amount of frothing or bubbling occurs. Thus, in accordance with the present invention, for a given height of tubular member, an expanded mouth (i.e. second opening) will provide for the agitation of a larger volume of brewing ingredients than a cylinder of comparable height while at the same time avoiding spillage, since there is more volume in the open core of the large mouth for the foam to expand up into; a funnel (e.g. conical) form for the mouth is preferred in that not only is spillage avoided but the sloping inner surface of the mouth does not tend to undesirably capture brew mix or prevent brew mix from being evacuated from the brew vessel. Such a broadened may mouth obviate the necessity of inserting a (cone shaped) baffle directly within the core of the tubular member as is known in the prior art in order to suppress spillage; the broad mouth of the present invention may thus reduce the mass of the brewer which is to contact the brew mix (e.g. which can act as a heat sink).

As mentioned above the fluid displacement means for the present invention comprises positive displacement rotary pump means.

The reciprocating piston/cylinder combinations, as taught, for example, in the U.S. Pat. Nos. 3,565,641 and 3,369,478, are positive displacement pump means whereby the pumping action is effected by the reciprocating notion of a piston; the pumping action during a brew cycle being attributable to one or two piston strokes, namely a compression and/or decompression stroke. The fluid volume displaceable by a given sized piston/cylinder combination of these refrences is, however, limited by the volume displaceable during a piston stroke; thus, for a given piston/cylinder construction the maximum total fluid volume which may be displaced on each stroke remains essentially constant. Additionally, neither of these references concern themselves with the problem of how to facilitate the conversion of a machine to a machine able to deliver a larger volume of coffee without major modifications to the pumping element thereof.

In accordance with the present invention it has been determined that the use of a positive displacement rotary pump means, provides surprising and significant benefits as against the use of the above mentioned piston/cylinder combination.

For a rotary pump means, the main pumping action is caused by relative movement between a rotating element and a stationary element; in the context of the brewing cycle of a brewing machine as described herein, there is thus no upper limit as to the volume of fluid (e.g. air) that may be displaced by a particular pump during any portion of the brewing cycle, the duration of pump activation being the controlling factor in this respect. A number of benefits flow from the exploitation of such pump means.

One of the benefits is that air agitation can be fully controlled not only as to the duration of agitation but also as to the volume of air which is to be displaced and the volumetric rate at which air is forced through the floor; for any given configuration and size pump the total volume of air displaced will depend on the duration of pump activation (i.e. the time period of rotationy and the volumetric rate will depend on the speed of rotation of the rotor element of the pump means. The greater the volumetric rate, for example, the greater the agitation action. Thus, for a given brewer vessel size and a given rotary pump size, greater or lesser amounts of water and coffee may be used to provide small or large cups of coffee by not only controlling the amount of ingredients in the brew mixture but also the degree and duration of air agitation; e.g. a smaller volume of brewing mixture can be easily agitated for a smaller length of time than a larger volume of coffee so as to maintain a high product temperature; conversely agitation may be extended to maximize solubilization of soluble coffee elements.

Another benefit is that a relatively minor change in the brewer structure may give rise to the possibilty of producing a larger volume product from essentially the same brewing machine; namely, by switching to a larger size tubular member such as, for example, a tubular member having a conical form as hereinbefore described and increasing the amount of ingredients delivered thereto.

The positive displacement rotary pump means exploitable in the context of the present invention are those rotary pump means, the pump element(s) of which has a flexible or elastic pumping member which contacts the fluid being displaced; for the purposes herein the expression "a flexible (or elastic) pumping member" or the like shall be understood as referring to rotary pumps means wherein the elastic deformation of an elastic pumping member induces fluid displacement. The rotary pump means of course include the usual (known) motor and other mechanical/electrical elements (e.g. gear reduction elements, rotational speed variation means, etc.) for the operation of the pump element. The (rotary) pump elements generally comprise a body or housing (i.e. stator) and a rotary assembly (i.e. rotor).

A generally known class of preferred (rotary) pump elements which may be used in accordance with the present invention are the peristaltic pumps. Peristaltic pumps are commonly known as flexible tube pumps; their use is advatageous since the beverage can be effectively isolated from the majority of the elements of the pump so as to minimize or prevent contamination thereof. For these types of pumps the flexible pumping member generally comprises an elastic tube element which is subjected to a travelling squeeze action which induces fluid flow; the displacement of a volume of fluid is brought about by the fact that the fluid volume is bounded by the inner surface of the tube and defined by the locus of one or more compression points on the tube, the compression points being produced, for example, by the tube being elastically squeezed between one or more travelling rollers and a pump body wall.

The peristaltic pumps may be chosen from among the known available formats, provided of course that the pump(s) chosen are adapted to carry out the function of delivering air to and of evacuating the beverage from the brewing vessel through the permeable floor of the brewing vessel; the tube member should also be of a material acceptable for the transport of a product destined to be consumed by a human being. Thus, for example, the persistalitic pump may be model "series 9×9" from ANKO Products Inc., Pump Division, Bradentan, Fla. U.S.A.; a peristaltic pump is described in U.S. Pat. No. 4,909,136 in the context of a beverage brewer but this reference does not address the problem of providing an assembly incorporating a pump for agitating the brew mix with air and thereafter using the pump to evacuate the beverage from the brewing vessel.

In addition to peristaltic pumps, other flexible member pumps may be used which take the form of flexible vane pumps or flexible liner pumps. An example of a flexible liner pump (i.e. an orbital lobe pump) is shown in U.S. Pat. No. b3,537,384. These other types of pumps are also to be chosen on the basis that they must be suitable for the purposes herein.

The control means may comprise suitable conventional mechanism for activating and controlling the various members; such means are known in the art and will thus not be particularly described herein. The control means -may, for example, comprise any suitable timer control mechanisms for controlling in a timed brewing cycle sequence the amount of coffee grounds used, the amount of water used, the start and duration of air agitation, the start and duration of beverage suction and, if desired, the start and duration of air backflow for loosening the used coffee ground residue on the filter element.

The pump means may be operatively connected to the floor of the brewing vessel in any suitable manner whatsoever. For example, the pump means may be coupled to the floor by a plurality of pockets one wall of which is common with a portion of the permeable floor and each of which is connected to a manifold type fitting, the manifold in turn being operatively connected to the pump means. However, preferably, the pump means may be coupled to the floor by the compartement of the brew chamber assembly as shall be described hereinafter.

The present invention in accordance with a further general aspect relates to a brew chamber assembly for an apparatus for preparing or brewing a beverage from an aqueous medium and a particulate beverage material, the apparatus operating with a brewing cycle including the air agitation of a mixture of the aqueous medium and the particulate beverage material in a brew chamber, said brew chamber assembly comprising
 a brewing vessel having a floor,
 a compartment having a top wall, and
 a common partitioning wall, said common partitioning wall defining said top wall of said compartment and defining said floor of said brewing vessel,
at least a portion of said common partitioning wall being configured as a filter for the evacuation of beverage from said vessel and being permeable to air, said compartment having opening means for the entry of air thereinto during brewing and thereafter for the exit of beverage therefrom.

In accordance with a particular aspect the present invention realates to a brew chamber assembly as described above, wherein said brew chamber assembly is characterized in that the compartement has a hopper configuration for gathering beverage for discharge therefrom by the opening means.

In accordance with the present invention the brewing vessel may take the form as described above.

In accordance with the present invention, fluid displacement means of the present invention may be coupled to the fluid permeable floor of the brew vessel via the compartement. In this respect the compartement may take any suitable form whatsoever provided that opening means are provided which respect the required air and beverage flow. The opening means may for example comprise one or more open ended tubular extension members for coupling to plastic tubing or the like for connection to the pump means, one end of the extension member opening into the interior of the compartment and the other opening into the said tubing; alternatively a portion of the body of a tubular extension member itself may pass through the wall and be disposed for the aspiration of beverage in the compartment.

Preferably, however, the brew chamber assembly as mentioned above is provided with a compartment having a hopper configuration for gathering the beverage for discharge therefrom by the opening means. It is to be understood herein that a configuration for gathering beverage is any configuration wherein the beverage is collected or concentrated so as to facilitate the dispensing of all or substantially all of the beverage (to the cup). Thus, a hopper compartement may be provided with inner surface(s) oriented so that the compartment is self-draining i.e. under the influence of gravity the fluid can drain through or be directed to the opening means for subsequent delivery to the dispensing station by pump means; although the pump means may take any form whatsoever, rotary pump means such as referred to above is preferred. The hopper compartment itself preferably has a funnel shaped (e.g. conical) inner surface with the opening means comprising an opening disposed at the apex thereof; this form can facilitate the evacuation of all of the beverage from the compartement.

The opening means also serves as a port of entry for agitation air delivered by the pump means. The agitation air is forced to pass through the filter floor whereafter it bubbles up through the brew mix providing agitation which facilitates the wetting and leaching/dissolving action.

In accordance with another aspect of the present invention air diffuser means may be disposed in the compartement. The purpose of the air diffuser means is to prevent or inhibit the air injected into the compartement (for agitation purposes) from impinging the permeable floor in a concentrated jet; the force of an uninhibited jet of air may be sufficient to undesirably expel brew mix from the brewing vessel. The air diffuser means is thus configured so as to break up or blunt any jet of air so that the air impinges the filter floor as a disturbed mass which is not (so) concentrated but (more) spread out over the surface of the filter floor. The air diffuser means may take any form whatsoever keeping the above in mind and that it is not to trap or interefere with the evacuation of beverage.

The air diffuser means may for example take the form of:

a) a separate cruciform structure with the intersection disposed downwardly and shaped so as to avoid trapping beverage. The intersection is so sized so as to break-up the air jet and to create a disturbed air mass;

b) a separate curved plate, with numerous holes performing the same function;

c) a flat portion of the wall of the compartment, the opening means being configured to direct the air jet so that the air jet impinges the flat surface at right angles;

d) etc..

As mentioned above the floor of the brewing vessel is configured as a filter for the evacuation of beverage from the brewing vessel, the floor also being permeable to air. The filter floor may take the aspect of the floor taught in U.S. Pat. No. 3,565,641. Thus the floor may be constituted by a (square) perforated plate and a filter element supported by the plate. The filter element may be in the form of a continuous strip of filter paper, micro mesh screen or any other known filter material suitable for filtering the brewed beverage. The floor may altenatively be a replaceable or permanent (micro) mesh screen which acts as both a support for the particulate beverage material (e.g. coffee grounds) and as a filter material thus eliminating the need for the perforated support plate. In any event as is known the mesh size of the filter element should preferably be such that it prevents or inhibits the used beverage material (e.g. coffee grounds) from falling through into the (hopper) compartement and thus into the delivered coffee drink;

it allows the principle of surface tension to operate so that the hot water does not undesirably penetrate the filter until at least the predetermined leaching-/dissolving process has been completed;

it permits the flow of coffee beverage through the filter when encouraged by the creation of a vacuum on the downstream side of the floor;

etc . . .

The present invention in accordance with another more particular aspect relates to an apparatus for preparing a beverage from an aqueous medium and a particulate beverage material, said apparatus having a brewing vessel having a floor, the floor being being configured as a filter for the evacuation of beverage from said brewing vessel and being permeable to air, supply means for supplying aqueous medium and said particulate beverage material to said vessel, fluid displacement means for forcing air into the brewing vessel through said floor and for withdrawing obtained beverage from the brewing vessel through said floor, control means for controlling the supply means and said pump means to effect a brewing cycle, said brewing cycle comprising supplying aqueous medium and particulate beverage material to the brewing vessel, forcing air through said floor to agitate a mixture of beverage material and aqueous medium in the brewing vessel and drawing the obtained beverage from the vessel through said floor, and a dispensing station for dispensing the obtained beverage characterized in that said apparatus has a compartment having a top wall and a common partitioning wall, said common partitioning wall defining said top wall of said compartment and defining said floor of said vessel, at least a portion of said common partitioning wall being configured as a filter for the evacuation of beverage from said vessel and being permeable to air, said compartment having fluid opening means for the entry of air thereinto and for the exit of beverage therefrom, and in that the fluid displacement means comprises one or more positive displacement rotary pump means, each said pump means having a flexible pumping member, at least one said pump means being operatively connected to said opening means of said compartment and to an air source for forcing air through said common wall into said vessel, at least one said pump means being operatively connected to said opening means of said compartment and to the dispensing station for withdrawing obtained beverage from the vessel through said common wall for delivery to said dispensing station, and said control means includes means for selectively activating said pump means to force air into said brewing vessel through said common wall and selectively activating said pump means for withdrawing beverage from said vessel through said common wall.

Supply means for supplying aqueous medium and said particulate beverage material to brewing vessel, as well as other components of a beverage brewing system or apparatus (such as conventional coffee cup dropper mechanisms, dispensing stations, etc.) are known in the art and will thus not be described herein in particular detail; see for example U.S. Pat. No. 3,565,641. The supply means may thus include a particulate beverage material (e.g. coffee) dispenser (for adding measured amounts of material to the brewer vessel) which may take the form of a hopper and a cylindrical spout, the mouth of the spout being disposed over the mouth of the brewer chamber. A suitable conveyor screw may be disposed so as to have a part in the spout and another part extending into the particulate material (e.g. coffee grounds) in the hopper; the screw, which may be in the form of an archimedes screw, may be turned by a suitable motor (controlled by a timer mechanism determining the duration of operation of the screw motor) to displace a measured amount of coffee into the brewer chamber. The supply means may also include any suitable means for introducing measured amounts of hot water suitable for brewing into the brewing vessel. The supply means may of course include means for providing hot water e.g. the water may have a temperature ranging from 195 to 200 F.; however, lower temperatures may be used provided that the desired brewing effect still occurs. The hot water dispenser may be of conventional form; the admission of hot water may for example be controlled by a suitable solenoid valve in conjunction with any (known) suitable timer mechanism.

In accordance with the present invention a brewing system can be provided with a reduced number of (moving) parts which contact the breverage and which is able to brew relatively larger single servings of beverage. The brewing vessel of the present invention chamber may if desired consist of a single cone shaped funnel, wide end uppermost, without the need for the inner cone of the prior art to inhibit or eliminate overflow due to the injection of air into the brewing vessel. Additionally, the present system provides for the possibility of introducing the air via a difused path so that the air does not pass through the filter floor explosively which again overcomes the need for the prior art interior baffle cone; the removal of this interior cone alone removes a heat sink so that the water may remain hotter to accelerate brewing process.

In drawings which illustrate example embodiments of the present invention:

FIG. 1 is a partialy cut away schematic view of an assembly of the present invention;

FIG. 8 is a side view of the apparatus shown in FIG. 6;

Figure 2:
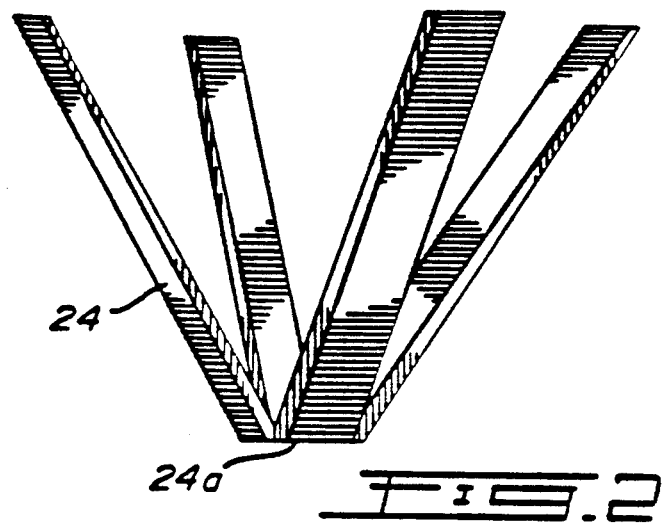
FIG. 2 is a side view of an air diffuser means in accordance with the present invention.

It is to be understood that the drawings generally only show the assembly and apparatus mechanism of the present invention. As mentioned above other components of a brewer system (such as the hot water and ground coffee supply means, conventional coffee cup dropper mechanism, control means for the control and operation of the ingredient supply means, fluid displacement means, etc.., the structure of the dispensing station, if desired, conventional coin-controlled means for activating the apparatus, timer mechanisms for controlling the brew cycle, etc...) are known in the art and will thus not be described in detail herein; see for example U.S. Pat. No. 3,565,641.

Particular example embodiments of the invention will hereinafter be described in more detail with reference to the figures, including a description of an embodiment incorporating aspects of the brewer disclosed in U.S. Pat. No. 3,565,641; further details with respect to the known utilized features of the reference may be gleaned from the reference itself.

Referring to FIG. 1, an example embodiment of an assembly in accordance with the present invention is shown schematically. The assembly has a fluid displacement means in the form of a peristaltic pump indicated generally by the reference number 1 and a brewing container in the form of a brew chamber assembly indicated generally by the reference number 2.

The peristaltic pump I is operated by a (if desired, variable speed) reversible motor (not shown), i.e. the shaft of the motor can be made to rotate in clockwise or anticlockwise fashion. The pump 1 has a housing 3 (only a portion of which is shown and which is cut away to expose the interior thereof). Two rollers 4 and 5 are provided within the housing 3. The rollers 4 and 5 are each rotatably mounted at opposite ends of a rotor arm 6 by respective axle pins 7a and 7b. The rotor arm 6 is itself fixed to a shaft 8 which is operatively connected to the the above mentioned motor shaft for rotation thereof. Each roller 4 and 5 can positively rotate about its respective axle pin 7a and 7b as the roller is made to rotate in the pump housing 3 by the motor. A tubing 9 of elastic material passes around the roller assembly and is squeezed between the rollers 4 and 5 and the internal circumferential surface 10 (as defined by the pump housing 3) such that rotation of the roller assembly induces fluid flow within the tube 9.

The tube portion 9a is connected to the brewer chamber assembly 2 while the tube portion 9b can be connected to a source of air (e.g. by being open or connected to ambient air) and to a dispensing station; i.e., as illustrated in FIG. 1, the end of the tube portion 9b is disposed above a dispensing station comprising a cut disposed on a support, the end of tube portion 9b being open to ambient air above the cup and being directed towards the interior of the cup. The tube 10 is shown as a single length of tubing. The tube 9 may, however, comprise a number of tube sections which are connected together in any known fashion; the pump portion of the tube may, for example, be separate from tube sections connecting the pump to the other elements, in order to facilitate replacement and repair.

As viewed in FIG. 1 a counterclockwise rotation of the roller assembly will suck fluid (e.g. beverage) into the pump from tube portion 9a and expel it out into tube portion 9b. On the other hand a clockwise rotation of the roller assembly will suck fluid (e.g. air) into the pump from tube portion 9b and expell it out into tube portion 9a.

Turning to the brewer chamber assembly 2, the assembly has a base structure 11 which is attached to or which is integral with a common wall indicated generally by the reference numeral 12. The assembly also has an open ended tubular member 13 and a hopper compartment 14.

The tubular member 13 is of circular cross section and is provided with a first lower opening indicated generally by the reference numeral 15 and an upper second opening indicated generally by the numeral 16. The member 13 has a lower portion 15a and an upper portion 16a; the upper portion 16a being wider in diameter than the lower portion 15a. The two portions 15a and 16a are connected by a conically shaped median portion 17, the inner surface of which slopes downwardly towards the first opening 15.

The common wall 12 which serves as the fluid permeable filter floor has a porous support element 18, a screen element 19 and a filter element 20. The underlying support 18 may be a separate element mounted to the base structure 12 in any suitable manner or may comprise a region integral with the base 12. The support 18 is provided with a plurality of relatively large openings one of which is indicated by the reference numeral 18a. The filter element 20 comprises part of a filter strip which is sized larger than the opening 15; a portion of the filter strip outside the confines of the tubular member 13 is shown with the numeral 20a. The screen 19 is mounted to the support element and is disposed so as to be between the filter element 20 and the support element 18. The screen 19 covers the openings in the support 18 and is configured to provide additional support for those parts of the filter element 20 which cover the openings in the support element 18; the screen element 19 does not per se have a filtration function and does not undesirably hinder the passage of fluid thru the common wall.

The tubular member 13 is displacable between an upper first position and a lower second paosition in the direction of the arrow 21. In FIG. 1 the tubular member 13 is shown in the second position wherein the circular bottom edge of the tubular member 13 (which defines the lower opening 15) is urged in a suitable fashion (such as is described in U.S. Pat. No. 3,565,641) to abut the filter element 20 so as to provide a sufficient sealing effect for the purposes of brewing a beverage; the common wall 12 and the tubular member 13 (in the second position) thus define a brewing vessel.

In use the brewing ingredients (e.g. ground coffee and hot water) are introduced into the brewing vessel via the opening 16.

The hopper compartment 14 is disposed on the other side of the common wall 12. For the embodiment shown the compartment has the aspect of a conical funnel; a portion of the side wall of which has been cut away to show the interior thereof. The wide circular edge 22a of the hopper compartment is sealing fixed to the base structure 11 in any suitable fashion (such as by welding, glueing, a screw gasket assemby, etc. . . ); the sealed circular edge confines the porous section of the base structure therewithin. The lower apex 22b of the hopper compartment 14 is provided with an opening (hidden behind the funnel wall) which is in fluid communication with the tubular extension member 23. The tubular memeber 23 is itself connected to the tube portion 10a.

Figure 2A:
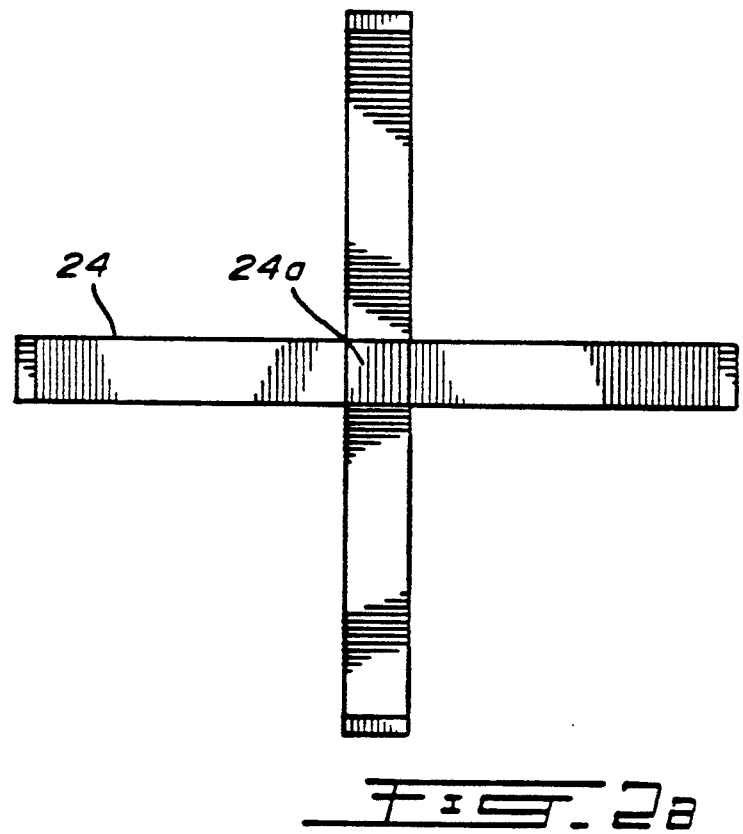
FIG. 2a is a top view of the air diffuser means shown in FIG. 2.

A cross or X-shaped air diffuser 24 is disposed in the hopper compartment 14; the lower flat face 24a of the air diffuser is disposed just above the apex opening of the compartment 14 so as to blunt the jet of air which may be delivered through tube portion 9a to the compartment 14. The air flow may thus be as indicated by the arrows one of which is designated with the reference numeral 25. FIGS. 2 and 2a illustrate the diffuser of FIG. 1; although the diffuser is shown with more or less straight arms, these arms may be outwardly if desired.

As can be seen in FIG. 1, the slope of the inner surface 26 of the hopper is such that the beverage (such as the drop 27) will flow to the apex opening i.e. be gathered to the apex opening.

In accordance with the assembly shown in FIG. 1 the single reversible peristaltic pump induces air agitation or beverage evacuation depending on the direction of rotation of the roller assembly therein. The tube 9 preferably is as short as possible to for example reduce heat loss through the tube walls. The tube 9 should also preferably be disposed so as to avoid U-shaped bends or other similar type beverage traps being set-up within the tube; for this purpose the interior of the tube may maintained in a vertical or vertically sloping postion so that all the beverage may flow downwardly to the dispensing station.

Figure 3:
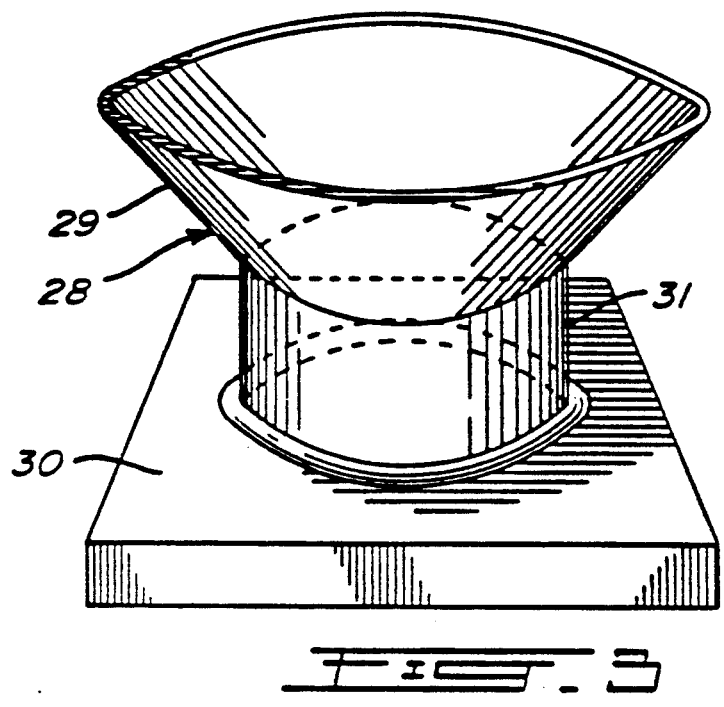
FIG. 3 is a perspective view of another embodiment of a brewing vessel in accordance with the present invention.

Referring to FIG. 3, an alternate embodiment of the tubular member is shown. The tubular member 28 has an upper wide mouthed hollow portion 29 of generally conical configuration. The upper portion is connected to the base structure 30 by the hollow cylindrical portion 31. The base and underlying compartment may be configured as shown in FIG. 1. If desired the cylindrical portion 31 may be omitted and the conical portion be connected directly to the base 30; if the side wall(s) of the underlying compartment are conical shaped, the side wall(s) of the upper portion 29 may be considered to represent a continuation thereof, the side wall(s) being interrupted by the common wall.

Figure 4:
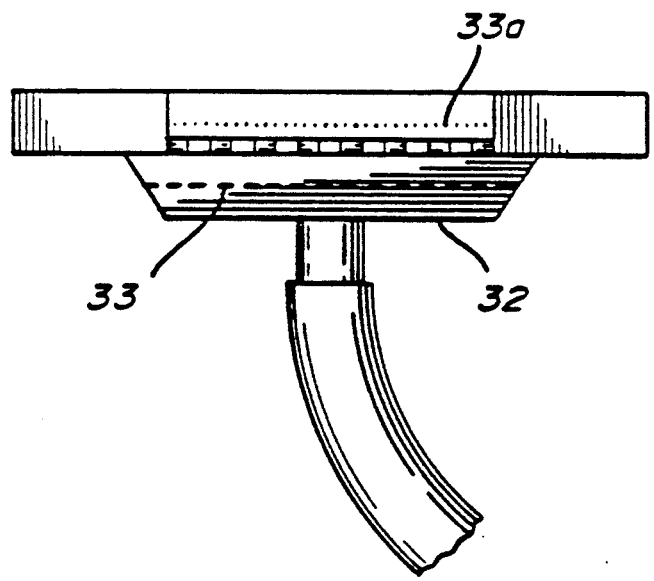
FIG. 4 is a side view of a another embodiment of a compartment in accordance with the present invention.

Referring to FIG. 4, an alternate form for the compartment is shown. The compartment 32 has a flat base surface but does include an air diffuser means 34 in the form of spaced strips 33; reference number 33a generally designates the common wall.

The operation of a brewing system incorporating an assembly as seen in FIG. 1 will now be generally described in relation to FIGS. 5a, 5b, 5c, 5d and 5e. For ease of illustration only the brewer chamber assembly is shown at various configurations during a brew cycle.

Figure 5A:
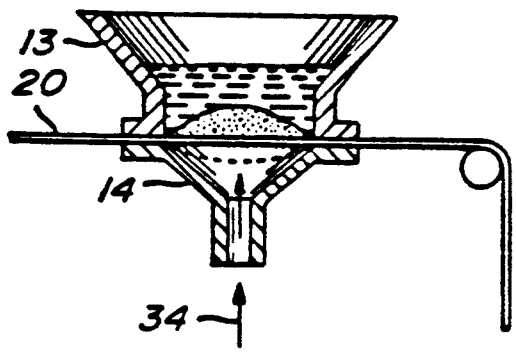
FIGS. 5a, 5b, 5c, 5d and 5e are schematic views of the operation of an assembly for a brewer system in accordance with the present invention at various stages of the brew cycle.

Referring to FIG. 5a a predetermined quantity of ground coffee and hot water (below the boiling point) are shown in the brewing vessel. The brewing begins as soon as the coffee grounds are in contact with the water. The brewing process is aided and accelerated by the air agitation of the coffee/water mixture; air agitation is created by blowing air designated by arrow 34 upwards through the filter into the mix for a predetermined time. The air which is blown up through the filter is provided by the reversible peristaltic pump (not shown) which sucks in the air through the same tube through which the coffee beverage is eventualy passed.

Figure 5B:
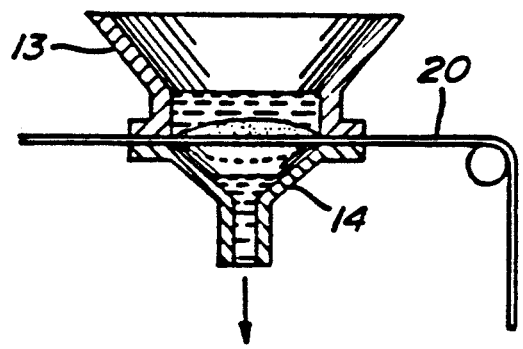

Referring to FIG. 5b, after the period of brewing/agitation is complete the pump is reversed i.e. the direction of rotation of the roller assembly is reversed. The pump then creates a suction vacuum in the lower compartment sufficient to suck beverage from the brewing vessel into the compartment 14 and on to the dispensing station. The pumping action continues so as to draw all drawable liquid from the coffee solids residue. If desired, the pump may again be reversed to pump a short air burst up into the residue to facilitate its subsequent separation from the filter strip 20.

Figure 5C:
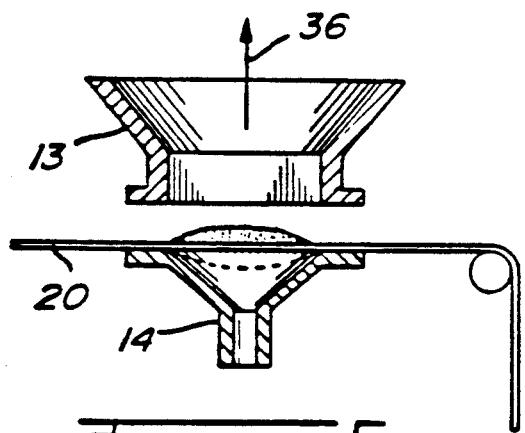

Refering to FIG. 5c, the pump has stopped and the tubular member 13 is raised in the direction of the arrow 36 to expose the coffee residue.

Figure 5D:
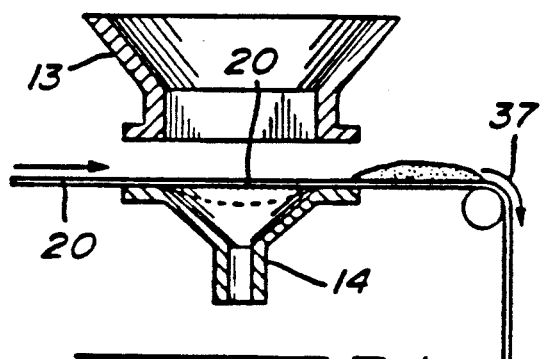

Referring to FIG. 5d, the filter strip 20 is displaced to one side so as to present a fresh filter surface below the tubular member 13. The solid coffee residue being dispatched in the direction of the arrow 37 wherafter the residue is separated from the filter strip and dumped into a disposal container.

Figure 5E:
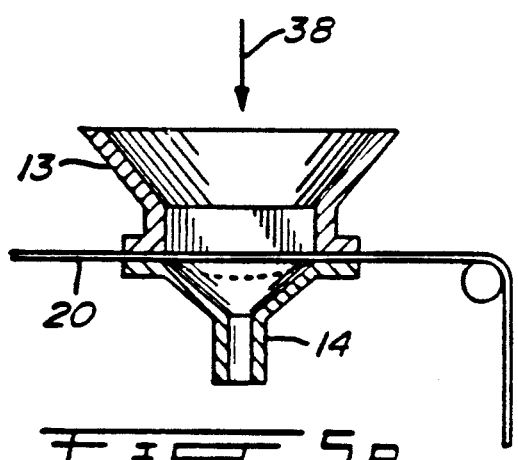

Referring to FIG. 5e, the tubular memeber is displaced in the direction of the arrow 38 until it is back into the brewing vessel configuration ready for the next brew cycle.

Figure 6:
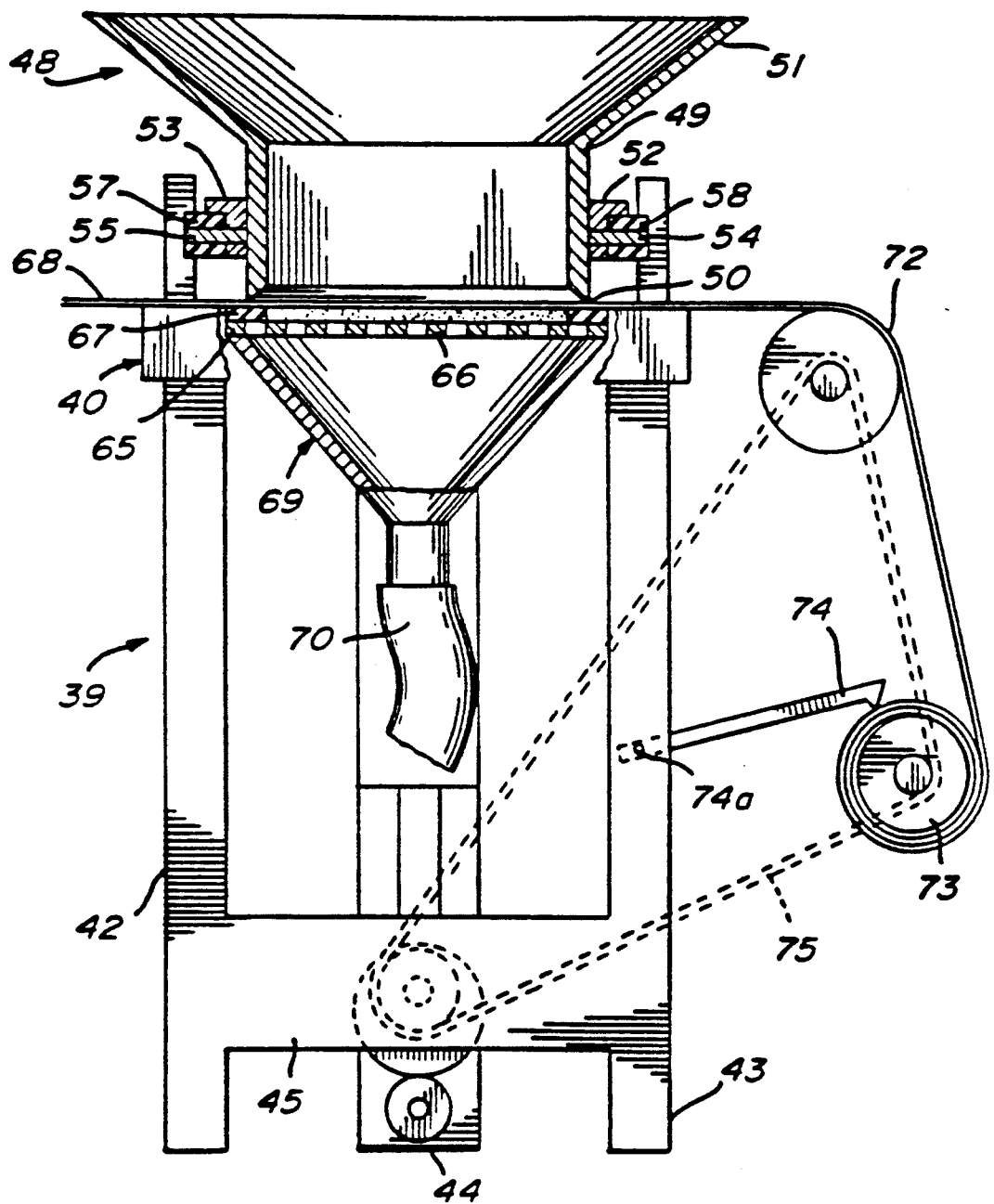
FIG. 6 is a partialy cut away front view of an apparatus embodying the assembly of the present invention.
Figure 7:
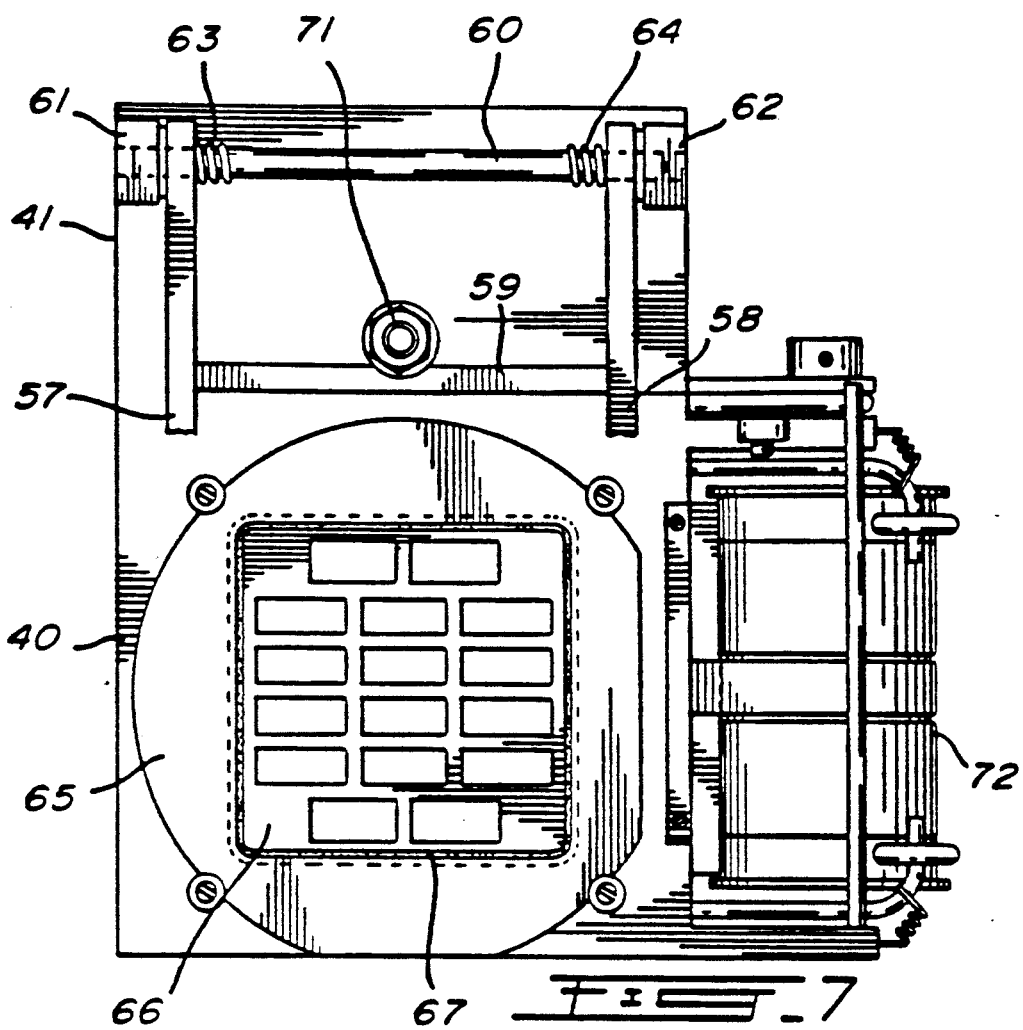
FIG. 7 is a partially cut away top view of the apparatus shown in FIG. 6 exposing the filter element support plate.

Referring now to FIGS. 6, 7 and 8, these figure illustrate an embodiment of a brewing chamber assembly of the present invention associated with known elements of the air agitation mechanism shown in U.S. Pat. No. 3,565,641.

The brewer unit shown in these latter figures comprises a base structure 39 having a brewer platform 40 and an extension platform 41 integral therewith. The platforms are supported by three spaced leg members 42, 43 and 44. The side legs 42 and 43 are attached to the rear of the brewer platform 40 and are joined together by a bearing strut 45. The third leg 44 is attached to the extension platform 41 and is centrally disposed with respect to the other legs When viewed from the front (see FIG. 6). The leg 44 also contains a bearing member 46 which is aligned with a corresponding bearing in the bearing strut 45; these bearings rotatably mount a drive shaft 47.

The brewing vessel is defined in part by an open tubular member 48. The tubular member 48 has a lower portion 49 which is square in cross-section and has a square bottom edge 50. The tubular member 48 also has a funnel shaped upper portion 51. Stub members 52 and 53 extend from opposite sides of the tubular member 48 and constitute mounting means for a pair of stub axles 54 and 55. These stub axles 54 and 55 are each pivotally mounted to an H-shaped support frame member 56, i.e. at the ends of respective fork limbs 57 and 58.

Referering to FIGS. 7 and 8, the H-frame 56 includes a spanner web 59 which connectes the limbs 57 and 58 together. The limps 57 and 58 of the H-frame are also pivotally mounted at the end remote from the tubular member on a second axle 60. The second axle 60 is supported between upright members 61 and 62 which extend a short distance upwardly from the extension platform 41.

Coil springs 63 and 64 are disposed about the axle 60 so as to bias the H-frame 56 and the tubular member 48 in a raised position as shown in dotted lines in FIG. 8.

Turning to FIG. 7, the brewer platform 40 has a central aperture beneath the lower edge 50 of the tubular member with a support shoulder for seating plate 65 which is of generally circular shape. The plate 65 has a generaly square opening with a square shoulder around the peripery thereof for seating a square perforated plate 66. A square gasket seal 67 of rubber or other resilient plastics material is disposed on top of the peripheral edge of the plate 66. The seal 67 stands more or less flush with the platform so as to constitute a seal for the lower edge 50 of the tubular member when it presses down on the floor. A support screen (not shown) is disposed over the top of the plate 66; the screen being sealingly fixed to the seal 67 by some suitable means such as an adhesive.

The plate 66 and the screen constitute part of the permeable floor and act to support the filter element 68 (see FIG. 6) which constitutes the remainder of the permeable floor. The filter element 68 has the form of a relatively long strip.

As shown in FIG. 6 the tubular member 48 is in its lower position wherein it is adapted to sealingly clamp the filter element 68 against the seal 67. When so clamped the permeable floor and the tubular member form the brew vessel and the floor forms the top of the lower compartment. It will be understood the if the lower edge 50 of the tubular member is not rectangular (e.g cylindrical) in shape the seal and plate arrangement will have a coresponding shape so as to provide a proper seal fit when the tubular member is clamped down on the permeable floor.

Turning to FIGS. 6 and 8, the hopper compartment 69 is sealingly fixed to the other side of the plate 65 (such as by welding, adhesive, etc.). For illustration purposes the interior diffuser is not shown in the hopper compartment 69. The tube 70 is connected, for example, to a peristaltic pump as described above.

Mounted to the drive shaft 47 is a cam mechanism which is configured to raise and lower a rod at the end of which is disposed a washer 71 which abuts the web 59 so as to raise and lower the tubular member 48; see U.S. Pat. No. 3,565,641 the contents of which are incorporated herein by reference for more specfic details. The tubular member 48 is raised only at the end of the brewing cycle so as to allow the used grounds to be removed.

Referring to FIG. 6, means indicated generally by the reference numeral 72 (such as described in the U.S. Pat. No. 3,565,641) may be provided to remove the portion of the filter trip on which is disposed the used coffee grounds when the tubular member is raised. The means shown however also includes shaft means 73 (i.e. take-up wheel) around which used filter strip may be rolled and scraper means 74 for scraping used coffee grounds off of the strip so as to fall into a lower refuse box (not shown); the scraper means 74 may be pivoted at one end 74a and be spring biased to rest in contact with used filter strip.

A synchronization chain 75 links the the tubular member 48 and the filter strip disposal means via suitable spoker/gear arrangements so that diplacement of the filter strip coincides with the lifting of the tubular member 48 away from the permeable floor.

The machine incorporating an assembly of the present invention may also have any appropriate timer means. The timer may control the energization of the coffee/water feed means as well as the pump means, etc.

An assembly in accordance with the present invention should of course be made of materials suitable for the intended use thereof; polycarbonates (shhet, rod, molding, etc..) silicone or neoprene food grade tubing, stainless steel, aluminum.

Comparison tests were conducted using the brew mechanism of the present invention and a known piston/cylinder brew mechanism. The basic brewing mechanism for the tests was a VKI 200 brewer made by VKI Technologies Incorporated (hereinafter referred to as the VKI brewer). The prior art machine tested consisted of the VKI brewer itself; the brewer of the present invention which was tested consisted of the VKI brewer but wherein the piston cylinder was replaced with a brewer chamber assembly and peristaltic pump such as shown in FIG. 1 (hereinafter referred to as the "invention" brewer).

Experiments using the above mentioned brewers were conducted to determine the percentage of soluble solids content in the beverage as well as the extraction efficiency as expressed by extraction percentage. Finely ground Columbian coffee beans were used. The coffee was used in an amount of 8.1 grams, with 150 cc of water; the inital water temperature for brewing was between 192 and 196 F. Air agitation for both the VKI brewer and the "invention" brewer was conducted for a period of 3.5 seconds; over this time period, the volume of agitation air for the "invention" brewer was 143 cc whereas the volume of agitation air for the VKI brewer was 115 cc. The VKI brewer cannot vary the amount of air no matter how many seconds.

Results were as follows:

| Sample | % soluble solids | weight of soluble solids | % (by weight) extraction | product temp. F. |
|---|---|---|---|---|
| 1 | .85 | 1.3 gms | 16.05 | 150 |
| 2 | .99 | 1.5 gms | 18.52 | 152 |
| avg | .92 | 1.4 gms | 17.28 | 151 |
| 3 | .784 | 1.2 gms | 14.92 | 144 |
| 4 | .701 | 1.07 gms | 13.21 | 145 |
| avg | .742 | 1.14 | 14.06 | 144.5 |

Samples 1 and 2 were for the "invention" brewer whereas samples 3 and 4 were for the VRI brewer.

As can be seen the "invention" brewer had a 25% increase in the percentage of soluble solids extracted and the extraction percentage was also improved by 23% (relative to the VKI brewer).

The industrial standards for
extraction rates are 16 to 25%,
for soluble solids are 0.8 to 1.2%.

Thus, as can be seen, the preformance of the VKI brewer fell short of the industrial standard whereas the performance "invention" brewer fell well within the above standards.

The invention assembly, used to replace the piston/cylinder of the VKI brewer for the tests, comprised
  a hopper compartment of a conical funnel shape the large mouth thereof being 3" in diameter; the opening at the apex being of ¼" diameter and the internal length of the funnel from the mouth to the apex opening being 2.5"; the funnel being made of acrylic material.
  the peristaltic pump used was model "series 9×9" from ANKO Products Inc., Pump Division, Bradentan, Fla. U.S.A.; the the tubing made of Norprene (TM) food grade tubing of I.D. ¼ inch; with a reversible motor running at 600 rpm to provide 3.5 ml/rev
  ¼ inch silicon tubing was used to connect the pump to the apex opening and the dispensing station; 12"×¼" ID for the connection to the apex opening and 6"×¼" ID to the dispenser.

Figure 9:
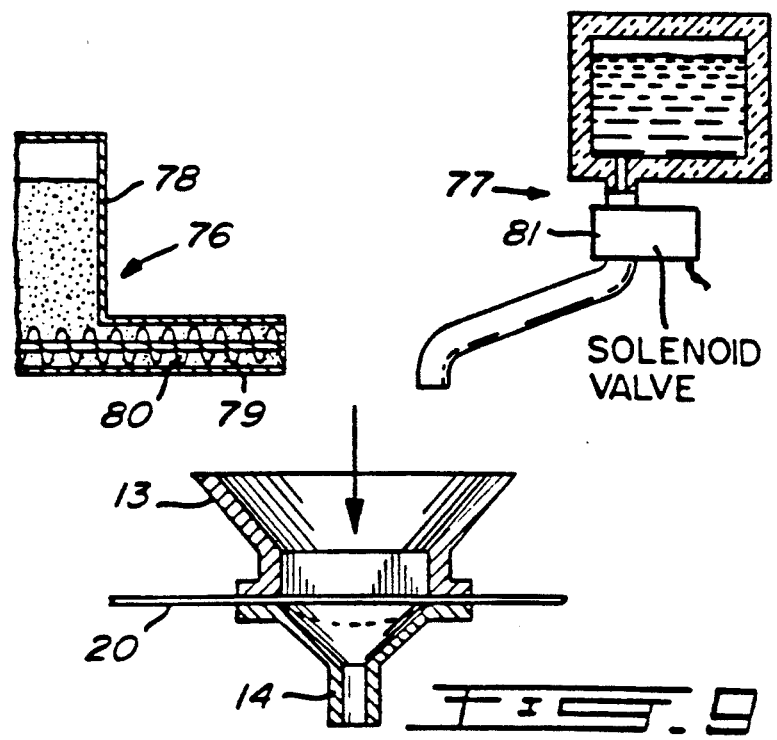
FIG. 9 is a partially cut away schematic view of a brewer chamber assembly in accordance with the present invention associated with example beverage material supply means and hot water supply means.

Turning to FIG. 9, this figure illustrates an example beverage material supply means 76 and an example hot water supply means 77 for association with a brew chamber assembly of the present invention. The illustrated beverage material supply means 76 has a hopper 78 and a cylindrical spout 79, the mouth of the spout being disposed over the mouth of the tubular member 13. A conveyor screw int he form of an archimedes screw 80 is disposed so as to have a part int he spout and another part extending into the particulate material (e.g. coffee grounds) in the hopper 78; the screw may be turned y a suitable motor controlled by a timer mechanism (both not shown) to displace a measured amount of beverage material into the tubular member 13. The hot water supply means 77 is of conventional form; the admission of hot water, for example, being controlled by a suitable solenoid valve 81 in conjunction with a suitable timer mechanism (not shown).

Figure 10:
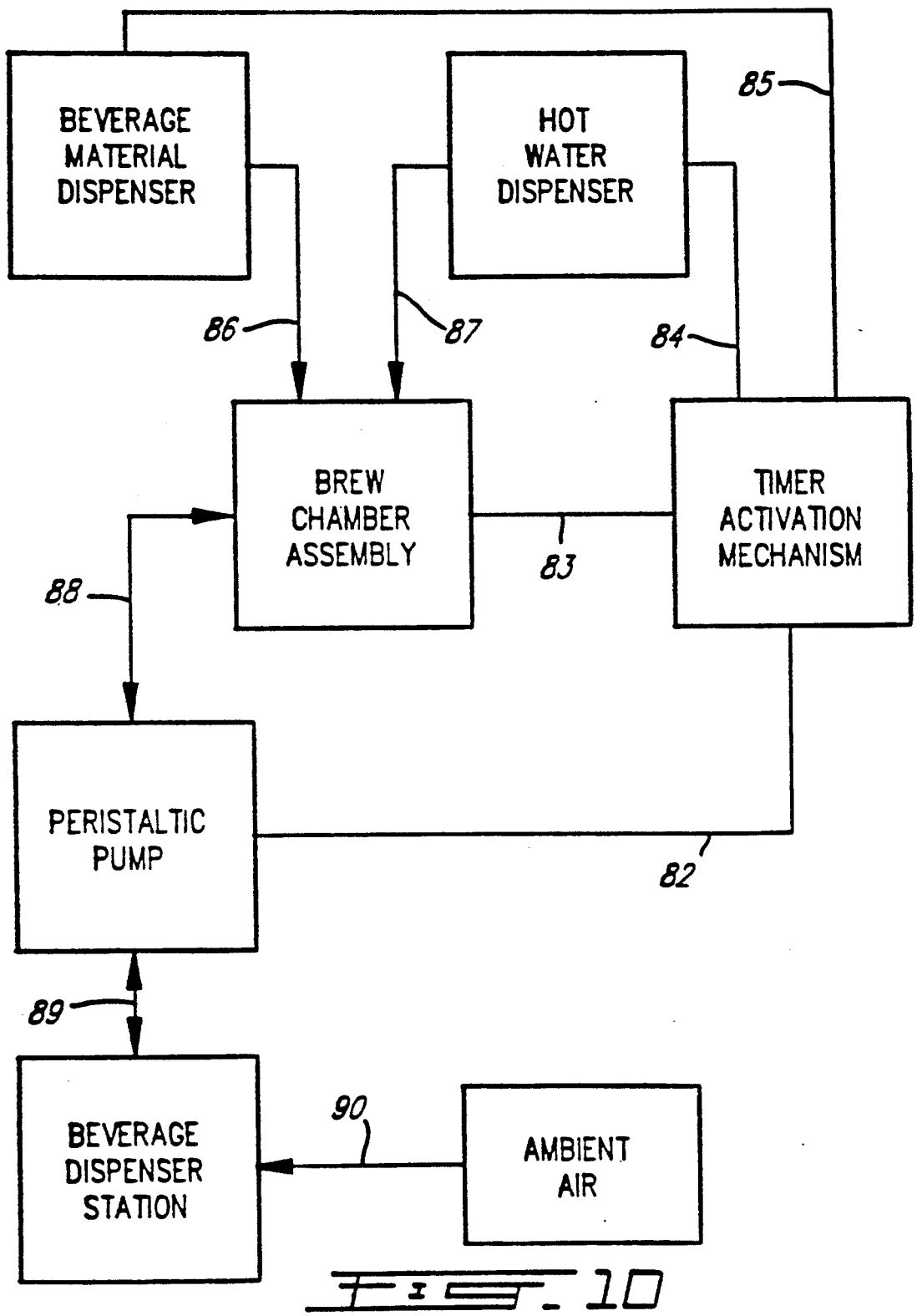
FIG. 10 is a block diagram schematically illustrating components of a beverage maker in accordance with the present invention including control means.

Referring to FIG. 10, this figure illustrates, in block diagram formate, various components of a beverage maker incorporating a brew chamber assembly in accordance with the present invention, the beverage maker including (conventional) control mean for (de)activation of the various elements thereof. Thus a (conventional) timer activation mechanism is shown as being connected tot he other elements by lines 82, 83, 84 and 85 respectively. The beverage material and hot water dispensers are shown as being operatively connected by the lines 86 and 87 respectively to the brewer chamber assembly, i.e. beverage material and water flow int he direction of the arrow heads. The peristaltic pump is shown as being operatively connected to the brew chamber assembly and to the beverage dispensing station by lines 88 and 89 respectively; these lines 88 and 89 having arrow heads pointing in opposite directions so as to highlight the fact that fluid may alternately move through the pump in opposite directions (i.e. agitation air in one direction and beverage in the opposite direction). The line 90 illustrates that the dispensing station is associated with a source of air (see, for example, FIG. 1).

We claim:

1. A brew chamber assembly for an apparatus for preparing a beverage from an aqueous medium and a particulate beverage material, said apparatus operating with a brewing cycle including the air agitation of a mixture of the aqueous medium and the particulate beverage material in a brew chamber, said brew chamber assembly comprising
  a brewing vessel having a floor,
  a compartment having a top wall, and
  a common partitioning wall, said common partitioning wall defining said top wall of said compartment and defining said floor of said brewing vessel,
at least a portion of said common partitioning wall being configured as a filter for the evacuation of beverage from said vessel and being permeable to air, said compartment having opening means for the entry of air thereinto and for the exit of beverage therefrom, said compartment having a hopper configuration having a sloped floor for gathering beverage for discharge therefrom by the opening means and said brew chamber assembly being characterized in that air diffuser means is disposed in said compartment.

2. A brew chamber assembly as defined in claim 1 wherein the compartment has a funnel shaped inner surface, the fluid opening means comprise an opening disposed at the apex thereof.

3. A brew chamber assembly as defined in claim 1 including an open ended tubular member displaceable between a first brewing position and a second non-brewing position, the tubular member having a first open end and a second opposite open end, the first open end, when said tubular member is in said first position, abutting said common wall such that the common wall and the tubular member define said brewing vessel, the first open end, when said tubular member is in said second position, being spaced apart from the common wall.

4. An brew chamber assembly as defined in claim 3 wherein the common wall comprises a perforated base and filter means for recovering beverage from said vessel, said filter means being permeable to air and covering the perforations of said base.

5. A brew chamber assembly as defied in claim 4 wherein the filter means comprises a filter strip sized to cover the first opening of the tubular member such that when the tubular member is in said first position, a portion of said filter strip is clamped between the portion of the tubular member defining said first opening and the perforated base.

6. A brew chamber assembly as defined in claim 5 wherein the common wall comprises a micromesh filter screen for recovering beverage from said vessel, said filter screen being permeable to air 7. An apparatus for preparing a beverage from an aqueous medium and a particulate beverage material, said apparatus having
  (i) a brewing chamber assembly, said brewing chamber assembly comprising
    a brewing vessel having a floor,
    a compartment having a top wall, and
    a common partitioning wall,
      said common partitioning wall defining said top wall of said compartment and defining said floor of said brewing vessel,
      at least a portion of said common partitioning wall being configured as a filter for the evacuation of beverage from said vessel and being permeable to air, said compartment having an opening means for the entry of air thereinto and for the exit of beverage therefrom, said compartment having a hopper configuration having a sloped floor for gathering beverage for discharge therefrom by the opening means, (ii) supply means for supplying aqueous medium and said particulate beverage material to said brewing vessel, (iii) fluid displacement means for forcing air into the brewing vessel through said floor and for withdrawing obtained beverage from the brewing vessel through said floor, (iv) control means for controlling the supply means and said fluid displacement means to effect a brewing cycle, said brewing cycle comprising supplying aqueous medium and particulate beverage material to the brewing vessel, forcing air through said floor to agitate a mixture of beverage material and aqueous medium in the brewing vessel and drawing the obtained beverage from the vessel through said floor, and (v) a dispensing station for dispensing the obtained beverage characterized in that the fluid displacement means comprises a reversible peristaltic pump, said pump being operatively connected on one side thereof to said opening means of said compartment and on the other side thereof to a source of air and to the dispensing station, and said control means includes means for selectively activating said peristaltic pump to force air into said brewing vessel through said common wall for air agitation of said mixture and selectively activating said pump for reverse operation for withdrawing beverage from said brewing vessel through said common wall for delivery to said dispensing station.

8. An apparatus as defined in claim 7 including air diffuser means disposed in said compartment.

9. An apparatus as defined in claim 7 wherein the compartment has a funnel shaped inner surface.

10. An apparatus as defined in claim 7 wherein the compartment has a funnel shaped inner surface, the fluid opening means comprising an opening disposed at the apex thereof.

11. An apparatus as defined in claim 10 wherein the tubular member has a conical cross-sectional configuration.

12. An apparatus for preparing a beverage from an aqueous medium and a particulate beverage material, said apparatus having (i) a brewing chamber assembly, said brewing chamber assembly comprising
a brewing vessel having a floor,
a compartment having a top wall, and
a common partitioning wall,
said common partitioning wall defining said top wall of said compartment and defining said floor of said brewing vessel,
at least a portion of said common partitioning wall being configured as a filter for the evacuation of beverage from said vessel and being permeable to air,
said compartment having an opening means for the entry of air thereinto and for the exit of beverage therefrom,
said compartment having a hopper configuration having a sloped floor for gathering beverage for discharge therefrom by the opening means, (ii) supply means for supplying aqueous medium and said particulate beverage material to said vessel, (iii) fluid displacement means for forcing air into the brewing vessel through said floor and for withdrawing obtained beverage from the brewing vessel through said floor, (iv) control means for controlling the supply means and said fluid displacement means to effect a brewing cycle, said brewing cycle comprising supplying aqueous medium and particulate beverage material to the brewing vessel, forcing air through said floor to agitate a mixture of beverage material and aqueous medium in the brewing vessel and drawing the obtained beverage form the vessel through said floor, and (v) a dispensing station for dispensing the obtained beverage, said apparatus being characterized, in that the fluid displacement means comprises a reversible peristaltic pump, said pump being operatively connected on one side thereof to said opening means of said compartment and on the other side thereof to a source of air and to the dispensing station, in that said control means includes means for selectively activating said peristaltic pump to force air into said brewing vessel through said common wall for air agitation of said mixture and selectively activating said pump for reverse operation for withdrawing beverage from said brewing vessel through said common wall for delivery to said dispensing station and in that said apparatus includes an open ended tubular member displaceable between a first brewing position and a second non-brewing position, the tubular member having a first open end and a second opposite open end, the first open end, when said tubular member is in said first position, abutting said common wall such that the common wall and the tubular member define said brewing vessel, the first open end, when said tubular member is in said second position, being spaced apart from the common wall.

13. An apparatus as defined in claim 12 wherein the compartment has a funnel shaped inner surface.

14. An apparatus as defined in claim 12 wherein the compartment has a funnel shaped inner surface, the fluid opening means comprising an opening disposed at the apex thereof.

15. An apparatus as defined in claim 14 wherein the fluid permeable common wall comprises a perforated base and filter means for recovering beverage from said vessel, said filter means being permeable to air and covering the perforations of said base.

16. An apparatus as defined in claim 15 wherein the filter means comprises a filter strip sized to cover the first opening of the tubular member such that when the tubular member is in said first position, a portion of said filter strip is clamped between the portion of the tubular member defining said first opening and the perforated base, and said apparatus includes means for displacing the filter strip, when said tubular member is in said second position, so as to present a fresh filter portion thereof for a subsequent brewing cycle.

17. An apparatus as defined in claim 16 wherein the common wall comprises a micromesh filter screen for recovering beverage from said vessel, said filter screen being permeable to air and the apparatus includes means for removing used beverage material from said filter strip after a brewing cycle.

18. An apparatus as defined in claim 17 including air diffuser means disposed in said compartment.

19. An apparatus as defined in claim 18 wherein the tubular member has a conical cross-sectional configuration.

* * * * *